United States Patent
Kimura

(10) Patent No.: US 7,267,024 B2
(45) Date of Patent: Sep. 11, 2007

(54) GEAR, AND METHOD AND APPARATUS FOR MANUFACTURING THE SAME

(75) Inventor: Makoto Kimura, Nagoya (JP)

(73) Assignee: O-OKA Corporation, Nagoya-shi (JP)

( * ) Notice: Subject to any disclaimer, the term of this patent is extended or adjusted under 35 U.S.C. 154(b) by 482 days.

(21) Appl. No.: 10/442,255

(22) Filed: May 21, 2003

(65) Prior Publication Data

US 2004/0231447 A1 Nov. 25, 2004

(51) Int. Cl.
*F16H 55/08* (2006.01)

(52) U.S. Cl. .................... 74/457; 74/459.5; 74/462

(58) Field of Classification Search ............ 74/457, 74/459.5, 460, 462; 409/8, 9, 10
See application file for complete search history.

(56) References Cited

U.S. PATENT DOCUMENTS

| | | | |
|---|---|---|---|
| 4,938,089 A * | 7/1990 | Ohoka | 74/339 |
| 5,363,714 A * | 11/1994 | Hoguchi | 74/432 |
| 6,351,886 B1 * | 3/2002 | Hasegawa | 29/893.32 |
| 6,935,482 B2 * | 8/2005 | Ooka | 192/108 |
| 2002/0184766 A1 * | 12/2002 | Kobayashi et al. | 29/893.3 |
| 2003/0226386 A1 * | 12/2003 | Ladousse et al. | 72/108 |
| 2003/0233900 A1 * | 12/2003 | Fujikawa et al. | 74/457 |
| 2005/0115349 A1 * | 6/2005 | Okumura et al. | 74/425 |

FOREIGN PATENT DOCUMENTS

| | | |
|---|---|---|
| JP | 62-207527 | 9/1987 |
| JP | 4-101731 | 4/1992 |
| JP | 5-84614 | 4/1993 |
| JP | 8-105515 | 4/1996 |
| JP | 2002-46030 | 2/2002 |

* cited by examiner

*Primary Examiner*—David M. Fenstermacher
(74) *Attorney, Agent, or Firm*—Oblon, Spivak, McClelland, Maier & Neustadt, P.C.

(57) ABSTRACT

An idler gear having a part worked by cutting is formed such that a chamfer part is formed at least on a portion between a tooth shape and chamfers are formed on the tooth shape by a forging process on an outer peripheral surface and an end part thereof in an axial direction by cutting.

13 Claims, 3 Drawing Sheets

PRIMARY FORMED ARTICLE

SECONDARY FORMED ARTICLE

AFTER CUTTING PROCESS

GEAR, AND METHOD AND APPARATUS FOR MANUFACTURING THE SAME

TECHNICAL FIELD

This invention relates to a gear having side faces worked by cutting and a method and apparatus for manufacturing the same.

TECHNICAL BACKGROUND

A gear formed by a forging process has pads projecting at least to a pressurized side surface. A cutting process is applied to the side surface in order to cut off the projecting part of the pads.

A weld flash occurs on an elongation of cut surface of tooth surfaces on the gear owing to the cutting process. Generally chamfering is carried out to a corner part in order to finish the corner part having the weld flash and this chamfering has been carried out by cutting.

A cutting process inherently has problems such as the attrition of tools, occurrence of chips, difficulty of forming optional forms and requiring long machining time. Particularly, chamfering must be carried out one tooth at a time by turns. Therefore, chamfering is inefficient and needs an appreciable amount of time.

Furthermore, when chamfering is carried out by cutting process in order to remove a weld flash generated by cutting side surface, a new weld flash can occur due to the chamfering.

A process yield is influenced on a large scale by the occurrence of weld flash and a step of screening defective products having weld flash was required.

DISCLOSURE OF THE INVENTION

The inventor of the present invention has confirmed to that it is avoidable for a weld flash to occur by cutting lies on said tooth part in forming a chamfer part, by a forging process, at least in a portion between a tooth part formed on an outer peripheral surface and by keeping a distance between the tooth part and the cut part of the end part in the axial direction, and, at the same time, that a weld flash, which has often occurred on a cut end surface accompanied by cutting, was decreased by the advantage of setting the angles of the cut part and the chamfer part degrees so as to be an obtuse angle, The inventors of the present invention also have paid attention to a concept of the invention that, in a gear having a part worked by cutting and the other processing, a chamfer part is formed at least in a portion between the tooth part formed on an outer peripheral surface and an end part (side surface) in an axial direction by the forging process.

Based on these technical concepts, the inventor of the present invention has made further extensive studies and developments, and has arrived at completion of the present invention.

It is an object of the present invention to provide a product having high reliability, a non-scattering quality, uniform and high accuracy, in order to manufacture a product having no weld flash, to attain lower costs, to avoid influences on process yield by an occurrence of a weld flash and to need no step of screening defective products having a weld flash.

The gear of the first embodiment of present invention includes a part worked by cutting and another process in which a chamfer is formed at least in a portion between a tooth part formed on an outer peripheral surface and an end part thereof in an axial direction, by a forging process.

The gear of the second embodiment of the present invention includes a gear in which a chamfer is formed by a forging process between the tooth part and the axial end part thereof worked by cutting.

The gear of the third embodiment of the present invention includes a gear in which the tooth part comprises a tooth form with chamfers formed by forging process.

The gear of the fourth embodiment of the present invention includes a gear in which the gear comprises an idler gear.

The gear of the fifth embodiment of the present invention includes a gear having a side face worked by cutting in which a part of a chamfer formed at least in a portion between the tooth part formed on the outer peripheral surface and cutting face by forging process remains therebetween.

A method for manufacturing a gear of the present invention having a part worked by cutting is also disclosed in which a chamfer is formed at an end part, in tooth trace direction, of the tooth form formed on the outer peripheral surface by forging process, and an end part in an axial direction is worked by cutting in order that the chamfer remains between the tooth part and the cut part.

A further method for manufacturing a gear of the present invention is also disclosed in which a tooth part having a chamfer is formed at one end thereof on an outer peripheral surface thereof by a forging process.

Another method for manufacturing a gear of the present invention is also disclosed in which a stepped part is formed by forming a chamfer at the other end of said tooth part.

An additional method for manufacturing a gear of the present invention is provided in which pads, connected with the chamfer formed in a portion of the stepped part, are cut.

A further method for manufacturing a gear of the present invention having a side surface worked by cutting is disclosed in which a chamfer is formed at an end corner part, in tooth trace direction, of a tooth formed by a forging process, and the side surface is cut in order that at least apart of the chamfer remains in a portion between the tooth part on the outer peripheral surface and cut face.

Another method for manufacturing a gear of the present invention is disclosed in which an end of a chamfer is formed in order to connect the outer peripheral surface of the tooth part corresponds to the cut face.

An apparatus for manufacturing a gear of the present invention having a part worked by cutting is provided in which a forging device is provided for forming a chamfer at an end corner part, in a tooth trace direction, of a tooth form formed on an outer peripheral surface by forging process, and a cutting device for cutting an end corner part in axial direction is utilized in order that the chamfer remains between the tooth part and cutting part.

An apparatus for manufacturing a gear of the present invention is provided in which a die includes a cavity having an inner peripheral surface formed to a tooth shape in response to a tooth formed of a primary formed article, and a bottom surface having chamfers forming parts is arranged in response to the tooth form of the primary formed article, a die plate for supporting the die, a mandrel is projected from the die plate to a center within the cavity, a lower mold comprising a knockout sleeve projectably provided into the cavity by a plurality of ejector pins, coaxially provided with the mandrel, and an upper mold comprising a cylindrical punch supported by a punch case.

In a gear of the first invention having a part worked by cutting and the other process, having the above described construction, a chamfer is formed at least in a portion between a tooth part formed on an outer peripheral surface and an end part thereof in an axial direction by a forging process.

Therefore the present invention attains products having a high reliability, compared with conventional cutting, a high degree of freedom of form of a chamfer part, a non-scattering quality owing to no weld flash standing between said tooth part, and uniform and high accuracy. The present invention also prevents indentation, abnormal noise and vibration of a tooth surface and to improve lifetime.

In a gear having a side face worked by cutting in the present invention, having the above described construction, a part of a chamfer formed at least in a portion between the tooth part formed on the outer peripheral surface and cutting face by forging process remains therebetween.

Therefore the present invention attains products having high reliability, as compared with conventional cutting, a high degree of freedom of form of a chamfer part, non-scattering quality owing to no weld flash standing between the tooth part, and uniform and high accuracy. The present invention also prevents indentation, abnormal noise and vibration of a tooth surface and improves lifetime.

In a method for manufacturing a gear having a part worked by cutting according to present invention, having the above described construction, a chamfer is formed at an end part, in a tooth trace direction, of the tooth form formed on said outer peripheral surface by a forging process, and an end part in an axial direction is worked by cutting in order that the chamfer remains between the tooth part and the cut part.

Therefore the present invention the has the effect of attaining products having a high reliability as compared with a conventional cutting process, in order to provide a product having no weld flash and to enable lower costs owing to no need for cutting to form a chamfer part. The present invention also avoids having an influence on process yield by the occurrence of weld flash and the need for screening defective products having weld flash.

In a method for manufacturing a gear of the ninth invention having the above described construction, according to the eighth invention, pads, connected with the chamfer formed in a portion of said stepped part, are cut.

Accordingly, the present invention has such features and effects that a weld flash which conventionally occurs at an end part of the step part away from the tooth part and the weld flash doesn't stand between the tooth part, so as to prevent indentation, abnormal noise and vibration of a tooth surface and to improve lifetime.

In a method for manufacturing a gear having a side face worked by cutting according to the present invention, having the above construction, a chamfer is formed at an end corner part, in tooth trace direction, of a tooth formed by a forging process, and the side surface is cut in order that at least a part of the chamfer remains in a portion between the tooth part on the outer peripheral surface and cut face.

Therefore the present invention has the effect of attaining products having a high reliability as compared with a conventional cutting process, to attain a product having no weld flash, to avoid influence on process yield by the occurrence owing to no weld flash standing between the tooth part and which needs no step of screening defective products having no weld flash.

In an apparatus for manufacturing a gear having a part worked by cutting also according to the present invention, having the above described construction, the forging device forms a chamfer part at an end corner part in tooth trace direction of tooth form formed on an outer peripheral surface by forging process, and the cutting device cuts an end part in axial direction in order that the chamfer part remains between the tooth part and the cutting part.

Therefore the present invention has the effect of attaining a product having high reliability compared with conventional cutting, so as to attain products having no weld flash, to attain lower costs owing to no need for cutting to form a chamfer, to prevent influence on process yield by the occurrence owing to no weld flash standing between the tooth part and no need for a step of screening defective products having weld flash.

BEST MODE FOR CARRYING OUT OF THE INVENTION

A preferred embodiment of the present invention will now be described with reference to the drawings.

Figure 1:
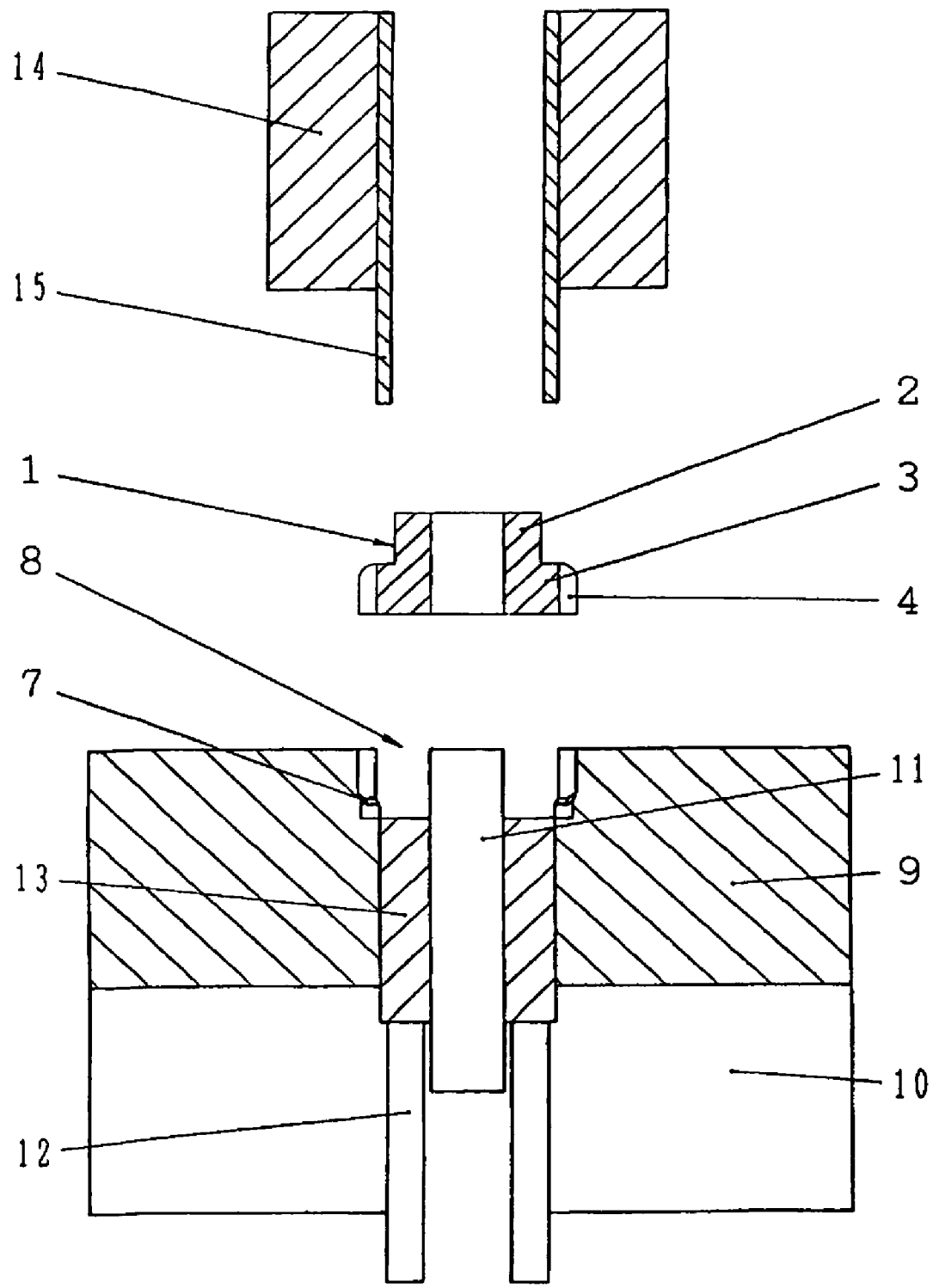
FIG. 1 is a sectional view showing a forging device for forming a gear according to the embodiment and the example of the present invention.
Figure 2:
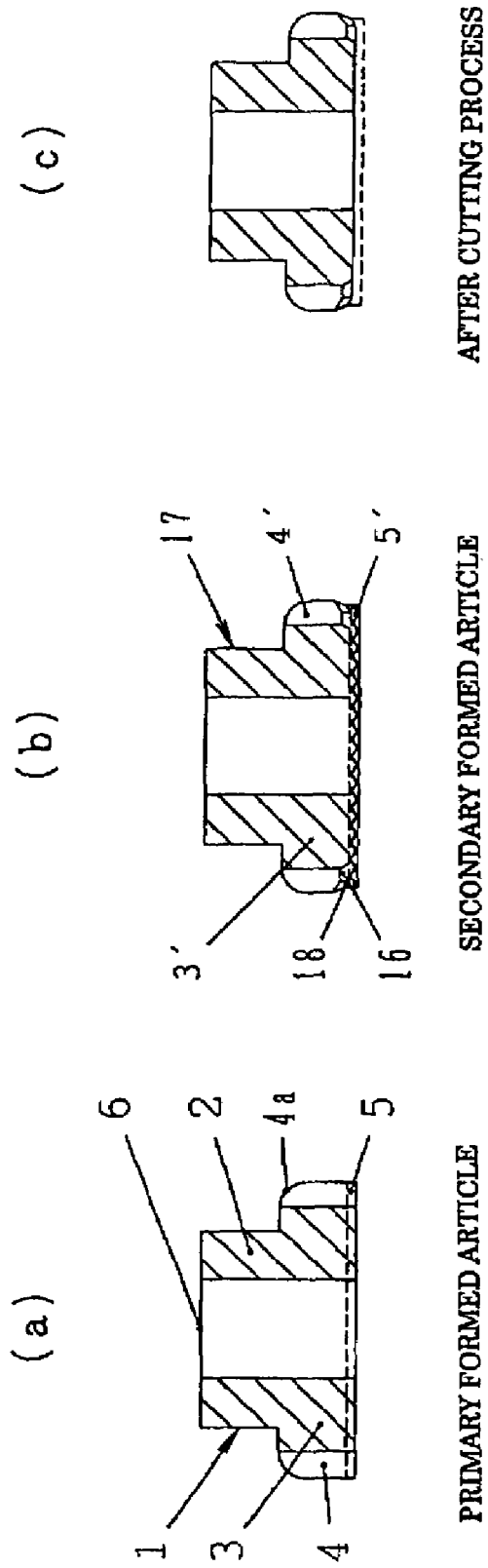
FIGS. 2(a)-(c) are illustrative views showing forms of products of each process according to the embodiment and an example of the present invention.
Figure 3:
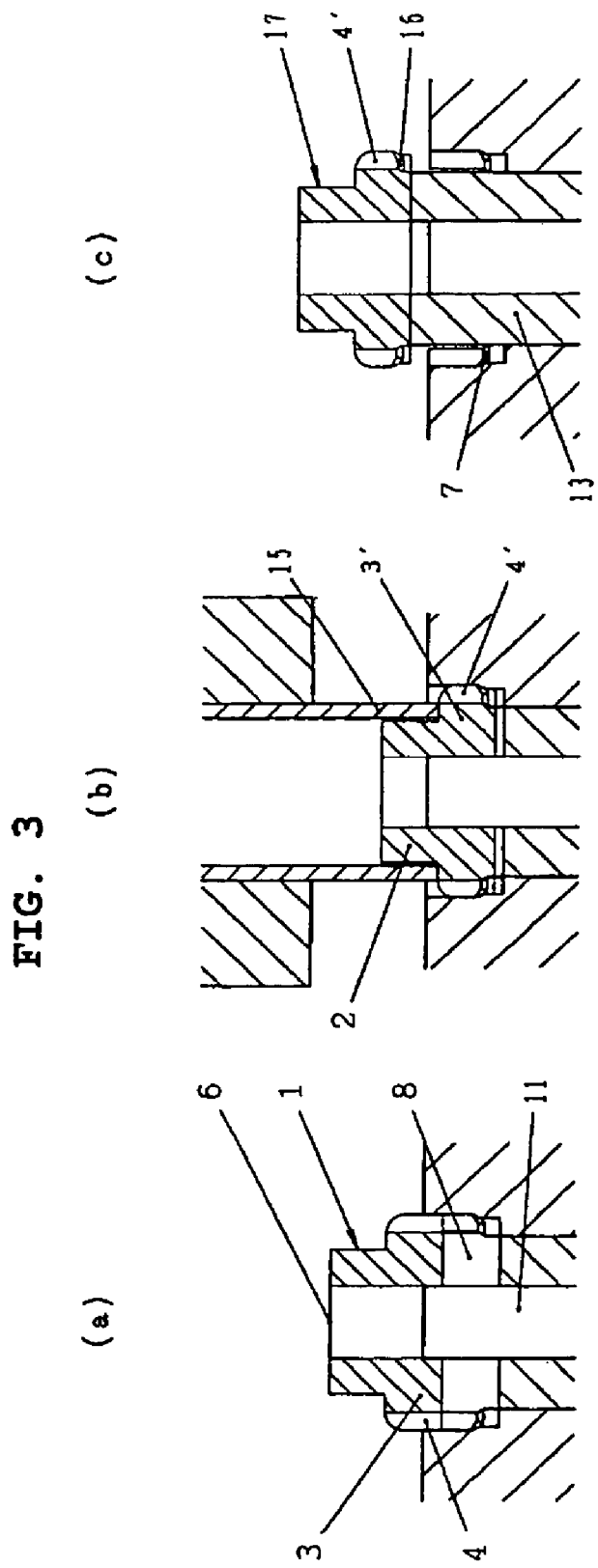
FIG. 3 is a detailed illustrative view of the forging process.

A gear of the present embodiment having a part worked by cutting and the other process is shown in FIGS. 1-3 wherein a chamfer part is formed at least in a portion between a tooth part formed on an outer peripheral surface and an end part thereof in an axial direction by a forging process.

A gear of the present embodiment, by way of example, comprises an idler gear used for automobile transmission according to the techniques of the present invention.

FIG. 1 shows a forging device for forming a chamfer part at an end part of tooth form of primary formed article. As shown in FIG. 2(a), a primary formed article 1 comprises a tooth form or shape 4 with a chamfer 4a around a gear part 3 formed at an end part of hub part 2, and the chamfer 4a is formed on the side of hub part 2 of tooth shape 4. Pads 5 project to the other side. Axial hole 6 is formed at the center.

The inner circumferential surface of the forging device is formed as a tooth-shaped form corresponding to the tooth shape 4 of the primary formed article 1 in order to set the gear part 3 of the primary formed article 1 as settled with the hub or boss part 2 upward.

The forging device comprises a die 9 constituting a cavity 8 having chamfer forming surface 7 at the bottom portion corresponding to the tooth shape 4 of the primary formed article 1, a die plate 10 for supporting the die 9, a mandrel 11 projected from the die plate to a center in the cavity 8, a lower mold comprising a knockout sleeve 13 projectingly provided in the cavity 8 by a plurality of ejector pins 12, 12..., coaxially provided with the mandrel 11, and an upper mold comprising a cylindrical punch 15 supported by a punch case 14.

By setting the primary formed article 1 in the cavity 8 with mandrel 11 inserted into the axial hole 6 (FIG. 3(a))) and moving the punch 15 downward, the hub part 2 of the primary formed article 1 is inserted into a cylinder of the punch 15, an upper surface of the gear part 3 excepting the tooth shape 4 is pressurized by the cylindrical end surface, the bottom end surface of the tooth shape 4 is pressed into the chamfer forming surface 7, and the stepped part having the chamfer part 16 on the bottom side surface of tooth shape 4 of the primary formed article 1 is formed (FIG. 3*b*).

The secondary formed article 17 is ejected from the die by the ejector pins 12,12 through the knockout sleeve 13. Therefore the secondary formed article 17 (FIG. 2(*b*)) having the chamfer part 16 at the stepped part on the bottom side surface of tooth shape 4 as shown in FIG. 3(*c*) is attained.

The step part of the tooth shape 4' of the secondary formed article 17 has a slide surface towards the side face intended to be cut, as shown in FIG. 2 (*b*), and the pads 5' are cut off in one cut along the inclined surface 18 and the side face of the gear part continuing to the slide surface extremely to the end surface of the chamfer part 16 (FIG. 2*c*).

The chamfer part formed by the forging process between the whole outer peripheral surface as the end corner part of the finished tooth shape and the cut surface remains in the cut products. Therefore, products worked by cutting has no weld flash at least on the tooth surface.

Thus, it is possible to provide a product of non-scattering in quality, uniform and high accuracy, and to improve productivity dramatically, owing to the chamfer part formed by forging process.

EXAMPLES

In the Examples of the present invention, the end of the chamfer part formed connected to the whole outer peripheral surface of said tooth part corresponds to the cut surface. By a forging technique, whatever form of chamfer part needed can be formed in response to a final form easily. Therefore, according to the present examples the chamfer part can remain 100% of products worked by cutting, weld flashes scarcely occurs and the forging process functions effectively and rationally.

Although, in the present invention, the chamfer part formed by forging process remains 100% of the time in order to avoid the occurrence of weld flash. Therefore, it is enough to obtain the same effect that tooth shape and the cut part are at different position each other, the tooth shape and the cut part maintain a distance each other and the small chamfer part remains.

In the example, the secondary formed article is an article formed with the chamfer part at the end corner part on the opposite side of the chamfer forming side of the primary formed article formed the tooth shape with chamfers. Although, informing the primary formed article, the chamfer part may be formed at the same time in parallel on forming the tooth shape without any problems, and the form or profile of a gear such as a gear without a chamfer and a gear with helical tooth should not be restricted by this example.

By using the form or mold having the chamfer forming surfaces at both the upper part and the lower part, it is possible to form the chamfer parts on both sides of the gear at once. Moreover, the inclined or taper surface towards the side face intended to be cut is sparingly needed or is not necessary, and the cut surface may possibly be a straight line without inclination.

According to the embodiment and example of the present invention, the chamfer part formed by forging process remains at least in a portion between the outer peripheral whole surface of the tooth part and the cut surface, and a weld flash can not occur on the tooth surface. In other words, in forging process, because the chamfer part is formed at least in a portion between tooth part formed on the outer peripheral surface and the axial end, a width shorter than the width in axial direction of the chamfer part is cut in order to finally complete the chamfer part, the tooth part and the cut part in the end of axial direction is kept a distance from each other. Therefore, it is possible to prevent the weld flash from standing between the tooth part when the weld flash occurs by cutting.

Because the chamfer part is formed by a forging process, the degree of freedom of design is higher compared with conventional cutting and the profile of the chamfer part can be in response to whatever. Moreover, machining time is shorter than that of the conventional cutting. It has good efficiency and makes it possible to attain the cost reduction desired. Furthermore, it has high reliability and is so suitable to provide products having no weld flash.

Particularly, the chamfer part is formed between the tooth shape on the outer peripheral surface and the cut surface, the angles between the cut surface of the cut part and the chamfer part can be set at an obtuse angle (for example, from 120° to 150°). In other words, the angles between an elongation of tooth part on the outer peripheral surface (an axial line of the gear) and the chamfer part can be set from 60° to 30° Therefore, the occurrence of weld flashes at the cut end surface by cutting can be reduced.

Moreover, the end of the chamfer part formed connected with the tooth part on the outer peripheral surface corresponds to the cut surface, therefore the whole of the chamfer part is used 100% of the time. When the end part corresponds to the cut surface, the cut surface connects with the surface of the chamfer part by forging process, therefore it is possible to minimize the occurrence of weld flash.

The preferred embodiment and one example of the present invention, as herein disclosed, are taken as one embodiment and example for explaining the present invention. It is to be understood, however, that the present invention should not be restricted by these embodiments and examples and any of a number of various modifications and additions are possible insofar as they are not beyond the technical idea or principle based on descriptions of the scope of the patent claims.

In preferred embodiments and examples of the present invention, an idler gear as an example of gears is described for explaining the present invention. It is to be understood that the present invention should not be restricted by these embodiment and example, and would be able to be applied to every kind of gears for automobiles or for the other use, in the case that weld flash occurs on gears, a part of which is processed by cutting or by the other process.

Moreover, it is to be understood that the above described chamfer part should not be restricted to a liner taper form, and a curved line such as an arc-like or a curved surface would be acceptable. Any form of the chamfer part would be enough to be accepted only when a stepped part is able to be formed between the gear part and the gear face.

Furthermore, according to the present invention, the chamfer part is formed between the tooth part and the cut surface. Therefore, when the tooth surface is worked by cutting or the other process, it is possible to minimize the occurrence of the weld flash.

What is claimed is:

1. A gear having a part worked by a cutting process, which comprises:
   a hub part,
   a gear part, having a larger diameter than that of said hub part, formed at an axial end part of said hub part,
   a tooth shaped formed on an outer peripheral surface of said gear part, and a chamfer formed at least in a corner portion between an axial bottom end of said tooth shape and said axial end surface of said gear part.

2. A gear according to claim 1, wherein said chamfer is formed by a forging process.

3. A gear according to claim 2, wherein said tooth shape comprises a tooth shape with chamfers formed by the forging process at both axial ends thereof.

4. A gear according to claim 2, wherein said tooth shape comprises a tooth shape with chamfers formed by the forging process.

5. A gear according to claim 4, wherein said gear comprises an idler.

6. A gear having a side face worked by cutting, which comprises
a chamfer having a chamfer part formed by a forging process which remains at least in a portion between a tooth shape formed on said outer peripheral surface and a cutting face, said chamfer being formed on at least one outer corner portion of said tooth shape.

7. A gear as claimed in claim 1, wherein said chamfer is formed at opposite ends of said tooth shape.

8. A gear having a cut side surface at an axial end surface, which comprises
a hub part,
a gear part, having a larger diameter than that of said hub part, formed at an axial end part of said hub part,
a forged tooth form formed on an outer peripheral surface of said gear part, and
a forged chamfer formed at least in a corner portion between an axial bottom end of said tooth shape and said axial end surface of said gear part.

9. A gear according to claim 8, further comprises
an axial hole coaxially formed with said hub part and said gear part at a center portion thereof.

10. A gear according to claim 9, further comprising
a second forged chamfer formed at the side of said hub part on said tooth shape.

11. A gear according to claim 10, wherein
said forged chamfer comprises a chamfer part formed between a whole outer peripheral surface of said tooth shape in a circumferential direction at an end corner part of said tooth shape and said cut side surface.

12. A gear according to claim 11, further comprising
a stepped part having said chamfer part formed on an axial bottom end of said tooth shape, wherein said stepped part has an inclined surface connected to said chamfer part and said axial end surface of the gear part.

13. A gear according to claim 1, wherein said tooth shape is located on an outermost peripheral surface of said gear part.

* * * * *